S. LAKE.
STORAGE BATTERY.
APPLICATION FILED JULY 6, 1907.
902,975.
Patented Nov. 3, 1908.
2 SHEETS—SHEET 1.
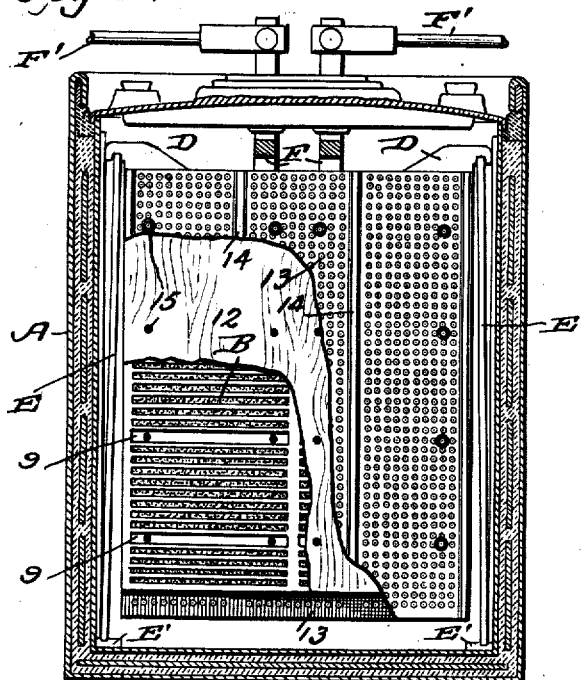
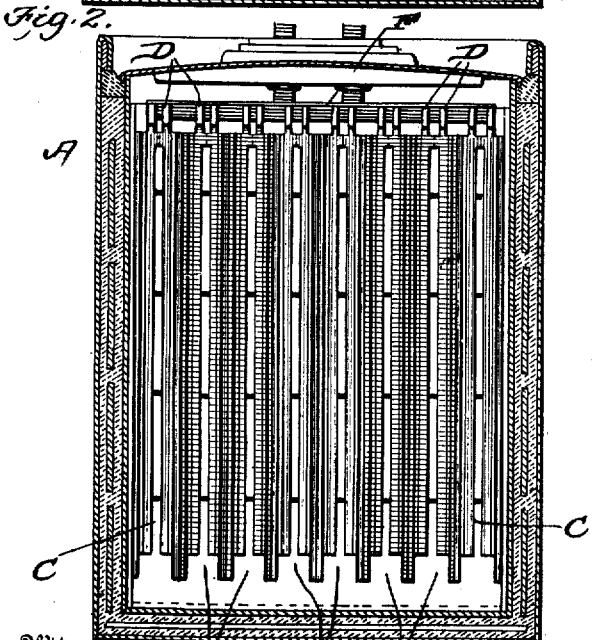
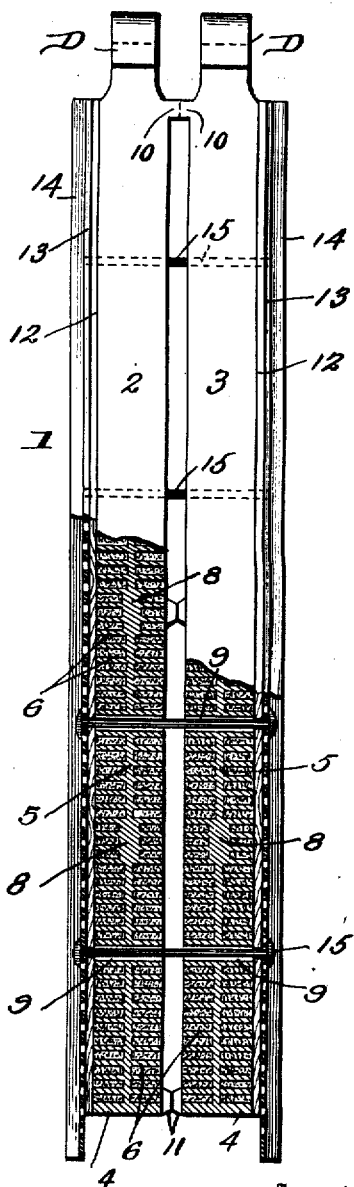
Inventor
Simon Lake.

S. LAKE.
STORAGE BATTERY.
APPLICATION FILED JULY 6, 1907.
902,975.
Patented Nov. 3, 1908.
2 SHEETS—SHEET 2.
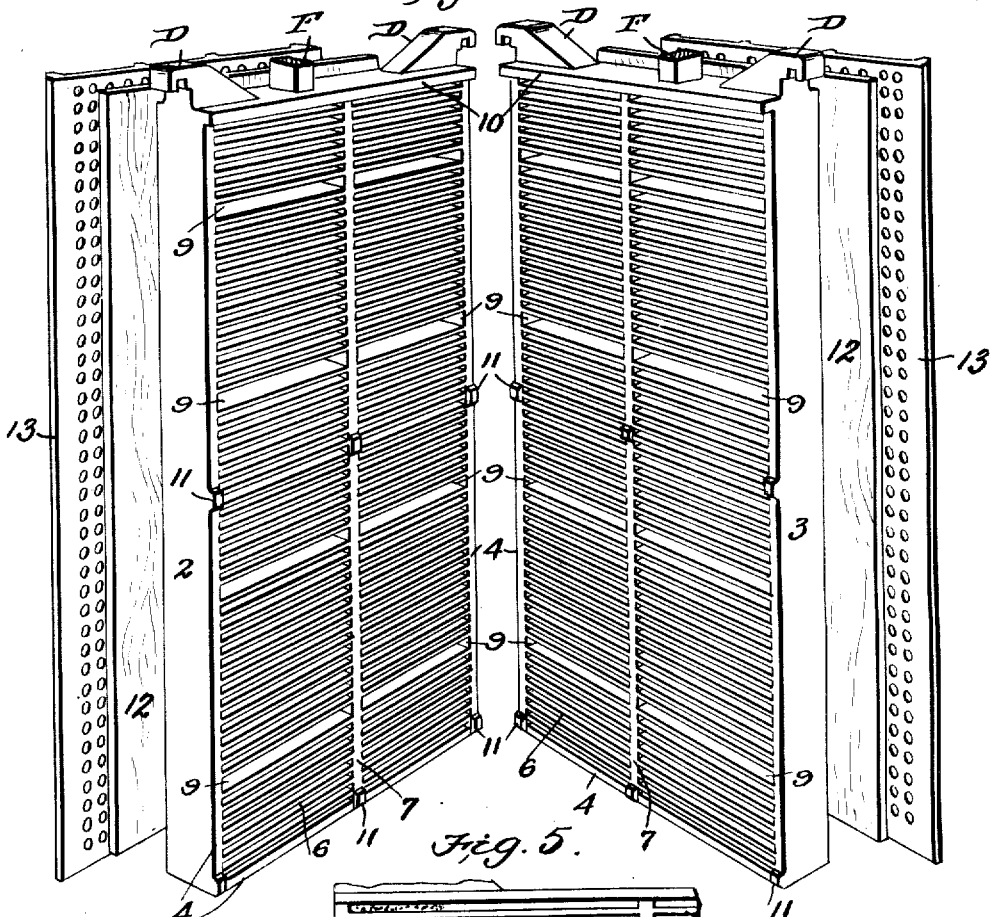
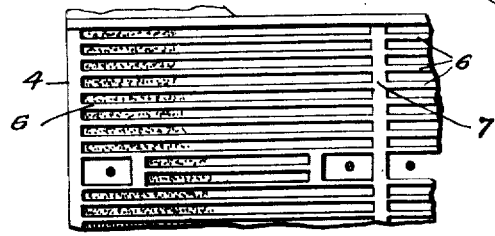
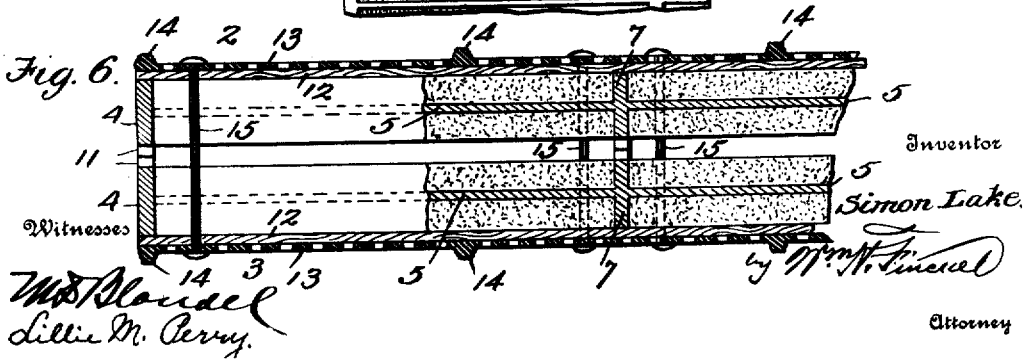
Witnesses
M. Blondel
Lillie M. Perry
Inventor
Simon Lake
by Wm. W. Finckel
Attorney

UNITED STATES PATENT OFFICE.

SIMON LAKE, OF BRIDGEPORT, CONNECTICUT.

STORAGE BATTERY.

No. 902,975.      Specification of Letters Patent.      Patented Nov. 3, 1908.

Application filed July 6, 1907. Serial No. 382,469.

*To all whom it may concern:*

Be it known that I, SIMON LAKE, a citizen of the United States, and a resident of Bridgeport, in the county of Fairfield and State of Connecticut, temporarily residing in London, England, have invented a certain new and useful Improvement in Storage Batteries, of which the following is a specification.

This invention relates to an improvement in storage batteries and particularly to the construction and arrangements of the plates, the object being to provide a construction in which a maximum amount of active contacting area for a given weight is provided for the electrolyte of the cell, without increasing the number of plates for the results obtained, thus preserving the space occupied by the plates without materially increasing the size of the cells or interfering in the least with the free circulation of the electrolyte, means being provided for holding the active material of the plates in position, and means being also employed for holding the plates in position relative to each other and also of preventing the accumulation or growth of the lead sulfate of the plates from coming into contact with the adjacent plates, which would cause a short circuiting, destroy the efficiency of the plates thus connected, and consequently decrease the life of the battery.

In the accompanying drawings, illustrating the invention, in the several figures of which like parts are similarly designated, Figure 1 is a vertical sectional view of a battery cell provided with my improved plates, parts of the latter being broken away to clearly show their construction. Fig. 2 is a similar view taken at a right angle to Fig. 1 and showing the plates in elevation. Fig. 3 is an enlarged end view of one of the plates, partly broken out and shown in section. Fig. 4 is a perspective view of one of the plates detached and illustrating the parts comprising one of the plates proper or units. Fig. 5 is a detail elevation of part of one of the grids illustrating a slight modification. Fig. 6 is an enlarged detail horizontal section of part of one of the plates.

In constructing a cell in accordance with my invention I employ any suitable tank A, best adapted for the purpose to which the battery is to be used and for the purpose of illustration, of substantially the construction shown in Patent No. 844,815 granted to me Feb. 19, 1907. In the cell are arranged the positive and negative plates B and C respectively, forming the subject matter of this application. Both sets of plates are provided with supporting lugs, or ears D, which rest upon glass supporting plates E mounted upon lead strips E', to prevent injury to the cell or tank. All of the plates of like polarity are electrically connected by means of the usual bus-bars, F having extensions which are connected with conducting cables, F' extending from one battery to the other, when arranged in series, or to the dynamo employed for recharging, or to the motor to which the current from the battery or batteries is to be supplied.

The positive and negative plates being similar with the possible exception of thickness, which may be varied without departing from the scope of the invention, I deem it sufficient to show only one plate or unit in detail, and to refer to the one plate or unit throughout the description.

By reference to Figs. 1 to 4 inclusive, the numeral 1 Fig. 3, designates one of the plates or units as a whole, which is constructed of two rectangular shaped sections or grids 2 and 3, each of which consists of a rim 4, and a central web 5, and from each side of the web extends in horizontal arrangement a series of ribs or fins 6, forming a series of grooves or recesses, in which is held the active material of the plates. The ribs or fins 6, are connected centrally of the grid by a vertically extending transverse strengthening rib 7, projecting from both sides of the web, and the webs of both sections are formed, at intervals, with enlargements 8 Fig. 3, extending from the vertical portion of the rim sections to the central rib to add rigidity to the sections. At intervals the webs 5, are cut out, to provide openings or slots 9 which extend from the vertical portions of the rims to the central rib 7. These openings permit of a certain amount of expansion of the sections without buckling, and also the free circulation of the electrolyte of the battery cell, and also the use of tie bands as will be explained hereinafter.

Preferably no active materials are placed in the slots 9, especially when they extend entirely across the grids or sections as shown in Figs. 1–4, but should the slots be made shorter and to extend only a short distance from the vertical portions of the rims and the central rib, as shown in Fig. 5, I may then insert the active material in the recesses between the slots.

The upper horizontal portion of the rim 4 of each section is provided with a slight inwardly extending flange 10, Figs. 2, 3 and 4, and these flanges are united, by burning, or otherwise, to form the sections into a single plate, the lower surfaces being spaced apart by lugs 11, thus providing a central recess extending below the flanges throughout the entire surfaces of the plates. The active material is inserted in the recesses before the sections are united and after the plates are thus formed the outer faces are covered by veneers of suitable wood or other porous material 12, which hold the active materials in place, and when the coverings are of wood it is of a quality to permit of a free penetration of the liquid. Upon each veneer of wood or other cover is a sheet of insulating material 13, preferably hard rubber, which is perforated throughout to permit of the liquid contacting with and penetrating the covers 12. Each insulating sheet has a series of vertically extending ribs 14, which may be continuous as shown, or interrupted or broken throughout their length as desired. These ribs 14 are designed to abut against similar ribs of adjacent sheets when the plates are arranged in a cell, to hold the plates sufficiently apart to permit of a free circulation of the electrolyte, and also to retain the plates in position and to prevent the veneers of wood from buckling when saturated with the electrolyte.

The sheets of rubber 13 are of somewhat greater length than the porous covers 12 and are extended below the lower edges of the latter and consequently the plates, the purpose being to completely protect the lower edges of the plates and permit of a certain amount of growth or formation of the lead sulfate without danger of its overlapping and coming in contact with the adjacent plates, which would cause short circuiting.

The porous covers and insulating sheets are held in place by a series of tie bands, or rods 15, preferably elastic, which are extended through the slots, 9, the porous covers, and the insulating sheets, and are connected to the latter by melting the ends of the bands and causing them to adhere to the sheets, or if desired, the ends of the bands may be united to suitable washers or buttons, and the latter allowed to contact with the sheets. This arrangement of holding the veneers of wood or other material and the insulating sheets in position also holds the lower ends of the sections forming the plates or units in position, and at the same time permits of a certain amount of expansion or contraction of the several elements without causing disintegration.

From the foregoing it will be seen that by my construction of battery plates a much greater active contacting surface is obtained for a given weight than heretofore, which at the same time allows of a free circulation of the electrolyte and its contact with the active material.

I desire it to be fully understood that I do not limit myself to the exact construction shown in the drawings as slight modifications may be made without departing from the broad principle of the invention, nor do I wish to limit myself to the number of plates employed as the number may vary according to the size of the battery cell and also to the use to which the cell is put.

What I claim is:—

1. A storage battery, each of whose units is composed of a pair of spaced-apart rectangular grids united at their tops and recessed below the point of union, said grids provided on both sides with a multiplicity of recesses containing active material, a porous cover arranged over each outer face of the grids next to the active material, and a non-conducting sheet arranged next to each cover, and means to yieldingly unite the grids, covers and sheets.

2. A storage battery, comprising a containing-vessel, a series of positive and negative plates arranged therein, each of said plates comprising two rectangular grid sections rigidly connected at their tops to form a unit and recessed below for circulation of the electrolyte and having a multiplicity of recesses on both sides, active material arranged in said recesses, a porous cover arranged over the outer face of each grid section, a non-conducting sheet arranged in contact with each porous cover, means to yieldingly unite the grids, covers and sheets of each unit, and conducting bars connected to the positive and negative elements.

3. A plate for storage batteries, comprising a plurality of rectangular sections having rims with flanges upon their adjacent upper horizontal edges, which are united to form a single plate, lugs formed upon the adjacent faces of the sections, central slotted webs connecting the rims, horizontal fins formed upon the webs providing a series of grooves for holding active material, a porous cover held over the outer face of each section, and a perforated non-conducting sheet held over each porous cover, said porous covers and non-conducting sheets being carried by the plate.

4. A storage battery plate, comprising a plurality of rectangular sections which are connected at one edge and their body portions spaced apart to facilitate circulation of the electrolyte of the battery cell, fins formed upon the opposite sides of the sections, active material held in the grooves formed by the fins, a porous cover held over the outer face of each plate, a perforated non-conducting sheet held over each porous cover, and means for securing together the said sections, covers and sheets.

5. A storage battery, comprising a suitable containing-vessel, a series of positive and negative plates held therein, each of said plates comprising two rectangular grid sections united at one edge and having recesses containing active material exposed on both sides of each section, spacing lugs arranged upon the adjacent faces of each section, porous covers held upon the outer faces of the plates, a perforated non-conducting sheet held upon each porous cover and projecting below the lower edges of the said porous covers, means for yieldingly holding the grid sections, porous sheets, and non-conducting sheets together, and bus-bars connecting all of the plates of like polarity.

6. A storage battery, comprising a suitable containing-vessel, a series of positive and negative plates held therein, each plate comprising two grid sections united at one edge and held apart throughout the remainder of their body portions, active material carried by the sections, a veneer of wood held over the outer face of each section, a perforated non-conducting sheet held adjacent to each veneer and having external ribs adapted to engage the ribs of the sheets of the adjacent plates, flexible retaining means for holding the elements of each plate in position, and bus-bars connecting the plates of like polarity.

7. A storage battery, comprising a suitable containing-vessel, a series of positive and negative plates alternately arranged therein, each of said plates comprising two grid sections having a series of grooves upon each side and openings extending entirely through the sections, active material held in the grooves, uniting flanges upon one edge of the sections, and lugs arranged upon each section for the purpose specified, a veneer of wood held over the outer face of each section, a perforated non-conducting sheet arranged over each veneer and projecting beyond the lower edge thereof, ribs formed upon the sheets which are adapted to engage the ribs of the adjacent sheets, elastic tie bands connected to the non-conducting sheets and extending through the veneers and openings in the grid sections, and bus-bars connecting all of the plates of like polarity.

8. A storage battery plate, constructed of sections connected together at one edge and having supporting lugs, each section having a series of grooves adapted to hold active material and also having openings, a porous cover arranged upon the outer face of each section, a perforated sheet held upon each of the porous covers and of a greater length than the porous covers, ribs formed upon the perforated sheets, and means for yieldingly holding the several elements in position.

9. A storage battery plate, constructed of two grid sections which are connected together to provide a central recess, fins formed upon each side of the grid sections to provide a series of grooves for the reception of active material, supporting lugs and bus-bar connections formed upon the sections, a veneer of wood arranged over each section, non-conducting sheets held over each veneer, said sheets being of a greater length than the veneers of wood, and flexible tie bands extending through slots in the sections and connecting the perforated sheets, thereby holding the grid sections, the veneers and perforated sheets in position.

10. A storage battery plate, constructed of two grid sections connected at one edge and having supporting lugs and bus-bar connections, each grid comprising a rim, a central web having slotted openings, a strengthening rib and a series of horizontal fins projecting from the webs and providing a series of grooves for holding an active material, a veneer of wood arranged over the outer face of each grid section, a perforated non-conducting sheet held upon each veneer and extending below the lower edges thereof, and flexible tie bands connected to the sheets and extending through the veneers and the openings in the webs of the grids.

11. A plate for storage batteries, comprising two rectangular sections having rims with flanges upon their upper horizontal edges which are united to form a single plate, lugs formed upon the adjacent faces of the sections, central slotted webs connecting the rims, horizontal flanges formed upon the webs and providing a series of grooves, and supporting lugs and bus-bar connections formed upon the sections.

In testimony whereof I have hereunto set my hand this 25 day of June A. D. 1907.

SIMON LAKE.

Witnesses:
H. D. JAMESON,
F. L. RAND.